United States Patent [19]

Townsend, III

[11] Patent Number: 4,792,183
[45] Date of Patent: Dec. 20, 1988

[54] DESK FOR USE IN AUTOMOBILES

[76] Inventor: William R. Townsend, III, 19W 071 18th St., Lombard, Ill. 60148

[21] Appl. No.: 114,041

[22] Filed: Oct. 29, 1987

[51] Int. Cl.$^4$ .............................. A47B 83/02
[52] U.S. Cl. ................... 297/163; 297/169; 297/146; 108/27
[58] Field of Search ............... 297/169, 163, 146, 191; 248/449, 453; 211/1.3; 108/27

[56] References Cited

U.S. PATENT DOCUMENTS

| | | | |
|---|---|---|---|
| 1,314,060 | 8/1919 | Hagerstrom | 108/27 |
| 1,398,496 | 11/1921 | Saltalamachia | 297/163 |
| 2,933,358 | 4/1960 | Sheble et al. | 297/163 |
| 2,973,028 | 2/1961 | Celeste | 297/163 |
| 3,050,355 | 8/1962 | Hess et al. | 297/163 X |
| 3,773,381 | 11/1973 | Brennan | 297/191 |
| 3,991,967 | 11/1976 | Sack | 248/453 |
| 4,159,071 | 6/1979 | Roca | 297/146 |
| 4,681,366 | 7/1987 | Lobanoff | 297/191 |

FOREIGN PATENT DOCUMENTS 20149  9/1914  United Kingdom ............ 108/27

Primary Examiner—Francis K. Zugel
Attorney, Agent, or Firm—Jerry T. Kearns

[57] ABSTRACT

A desk for use in automobiles is pivotally secured to a head rest of an automobile seat for selective angular adjustment. A pair of support arms are pivotally connected at one end to an elongated base secured to the head rest. A pair of cam locks secure the support arms for pivotal adjustment and maintain the arms in the selected adjusted position. A second pair of cam locks at opposite ends of the support arms pivotally mount a planar desk surface for selective angular adjustment. An elongated edge strip has a pair of spaced curved slots and is secured to a leading edge of the planar desk surface for movement to a raised or a lowered position. The desk is intended for use by back seat occupants of an automobile.

1 Claim, 4 Drawing Sheets

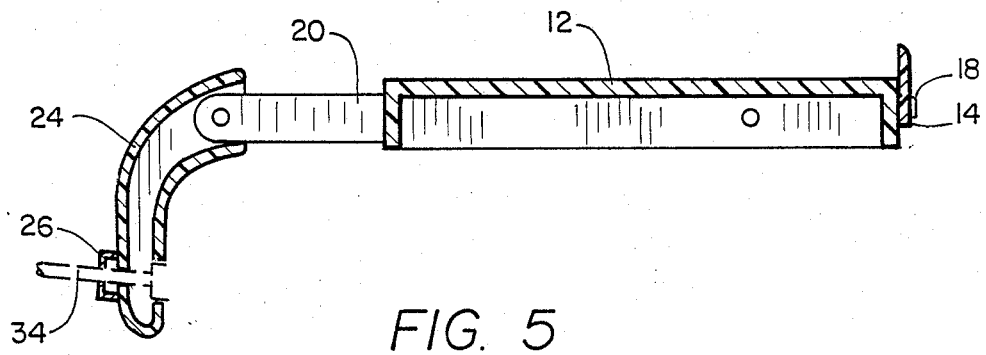
FIG. 5
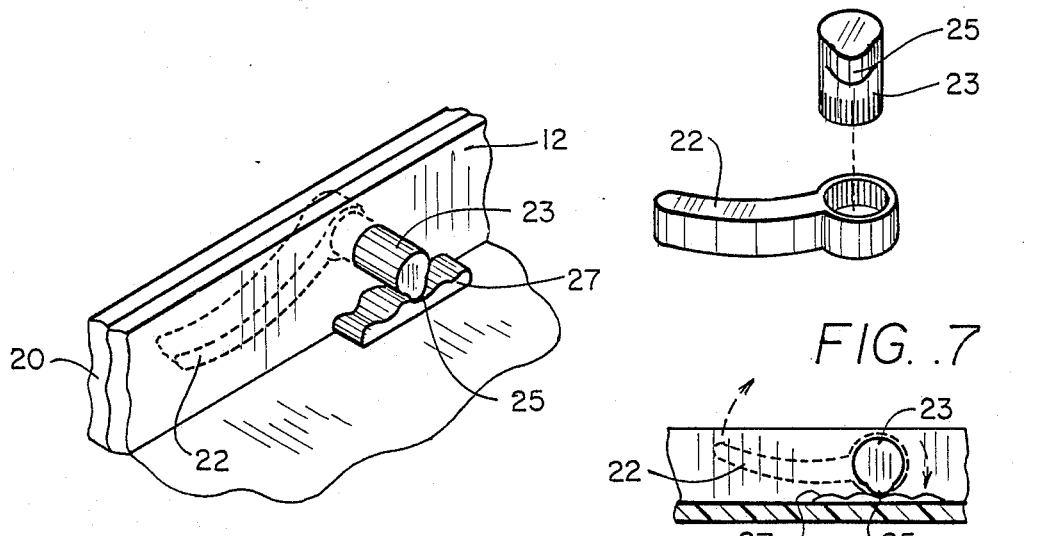
FIG. 6
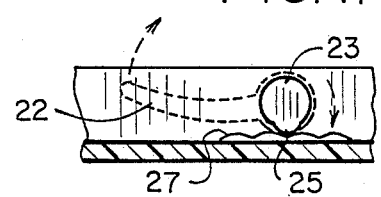
FIG. 7
FIG. 8
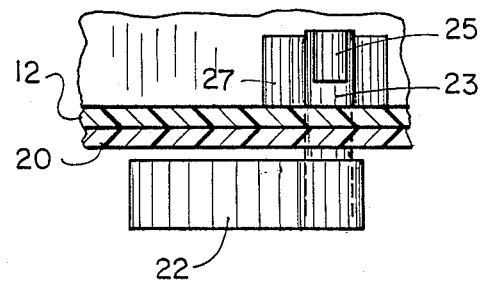
FIG. 9

DESK FOR USE IN AUTOMOBILES

BACKGROUND OF THE INVENTION

1. Field of the Invention

The present invention relates to desks for use in automobiles, and more particularly pertains to a new and improved desk for attachment to a head rest of an automobile seat. It has been difficult in the past to work or write in the back seat of an automobile. Back seat occupants have to resort to supporting the work surface on their lap, which is uneven and unstable. Prior art desks for use in automobiles have been bulky and cumbersome affairs which clutter the interior of the automobile when not in use. Children riding in the back seat of vehicles, especially on long trips, tend to become irritable and restless. The desk of the present invention may provide a diversion for children. In order to overcome these difficulties, the present invention provides a desk which is attached to the head rest of an automobile seat for pivotal movement to selected angular positions. When not in use, the planar desk surface folds parallel to the back of the front seat, to an unobtrusive storage position. The desk of the present invention is suitable for usage by children and working adults. The desk is not bulky, and may be left constantly attached to the head rest and pivoted to a storage position. In this manner, the desk is readily available when needed.

2. Description of the Prior Art

Various types of desks for use in automobiles are known in the prior art. A typical example of such a desk for use in automobiles is to be found in U.S. Pat. No. 3,625,161, which issued to B. Rosner on Dec. 7, 1971. This patent discloses a frame with a pair of hooks which may be placed over the back of an automobile seat. A tray is pivotally supported for movement between an open and a closed storage position. This desk is disadvantageous because of the limited range of adjustment and by the fact that the mounting hooks interfere with the comfort of front seat occupants. U.S. Pat. No. 3,650,223, which issued to Y. Kobori on Mar. 21, 1972, discloses a combination air bag and table. A curved metal hook is placed over the back of the front seat and mounts the table for use by back seat occupants. The table does not provide any adjustability and the mounting hook interferes with the comfort of front seat occupants. U.S. Pat. No. 3,893,569, which issued to F. Hoch on July 8, 1975, discloses a tray which is designed for use over the transmission hump on the floor of an automobile. This tray is not suitable for use by back seat occupants, and no adjustable writing surface is provided. U.S. Pat. No. 4,265,447, which issued to B. Shafer on May 5, 1981, discloses a combination car tray and exercising device for back seat passengers of an automobile. A pair of spaced hooks suspend the tray surface over the back of the front seat of the automobile. The tray surface is not adjustable and the device is quite bulky and cumbersome.

While the above mentioned devices are suited for their intended usage, none of these devices provides a pivotally adjustable desk surface which may be pivoted to an unobtrusive storage position. Further, none of the aforesaid prior art desks are mounted to the back of the front seat of an automobile in a fashion that does not interfere with the comfort of front seat occupants. Additionally, none of the aforesaid devices provide dual cam lock pivotal adjustment for allowing a large degree of freedom of adjustment for a planar desk surface.

Inasmuch as the art is relatively crowded with respect to these various types of desks for use in automobiles, it can be appreciated that there is a continuing need for and interest in improvements to such desks for use in automobiles, and in this respect, the present invention addresses this need and interest.

SUMMARY OF THE INVENTION

In view of the foregoing disadvantages inherent in the known types of desks for use in automobiles now present in the prior art, the present invention provides an improved desk for use in automobiles. As such, the general purpose of the present invention, which will be described subsequently in greater detail, is to provide a new and improved desk for use in automobiles which has all the advantages of the prior art desks for use in automobiles and none of the disadvantages.

To attain this, a representative embodiment of the concepts of the present invention is illustrated in the drawings and makes use of an elongated base provided with a pair of spaced apertures having compression fittings for receipt around the head rest support rods of an automobile seat. A pair of spaced support arms are pivotally secured adjacent opposite ends of the base by a cam lock mechanism. These cam lock mechanisms allow the support arms to be locked in any selected angular position. A planar desk surface is pivotally mounted between ends of the support arms by similar cam lock mechanisms. Thus, the surface of the desk may be tilted and locked in any desired angle with respect to the support arms. An elongated edge strip is provided with a pair of curved slots through which a pair of screws are passed which secure the edge strip to a leading edge of the desk surface. The edge strip may be moved between a raised and a lowered position. The edge strip serves, when in a raised position, to prevent materials from sliding off the tilted planar desk surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved desk for use in automobiles which has all the advantages of the prior art desks for use in automobiles and none of the disadvantages.

It is another object of the present invention to provide a new and improved desk for use in automobiles which may be easily and efficiently manufactured and marketed.

It is a further object of the present invention to provide a new and improved desk for use in automobiles which is of a durable and reliable construction.

An even further object of the present invention is to provide a new and improved desk for use in automobiles which is susceptible of a low cost of manufacture with regard to both materials and labor, and which accordingly is then susceptible of low prices of sale to the consuming public, thereby making such desks for use in automobiles economically available to the buying public.

Still yet another object of the present invention is to provide a new and improved desk for use in automobiles which provides in the apparatuses and methods of the prior art some of the advantages thereof, while simultaneously overcoming some of the disadvantages normally associated therewith.

Still another object of the present invention is to provide a new and improved desk for use in automobiles which may be secured to a head rest of an automobile seat and provides a planar desk surface for use by back seat passengers.

Yet another object of the present invention is to provide a new and improved desk for use in automobiles which is mounted for compound pivotal adjustment.

Even still another object of the present invention is to provide a new and improved desk for use in automobiles which, when not in use, may be pivoted to an unobtrusive storage position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross sectional view taken along line 5—5 of FIG. 4.

FIG. 6 is a detail view illustrating the cam lock mechanism of the desk of the present invention.

FIG. 7 is an exploded perspective view illustrating the construction of the cam lock mechanism of the desk of the present invention.

FIG. 8 is a side view of the cam lock mechanism of FIG. 6.

FIG. 9 is a cross sectional top view illustrating the cam lock mechanism of the desk of the present invention.

DESCRIPTION OF THE PREFERRED EMBODIMENT

Figure 1:
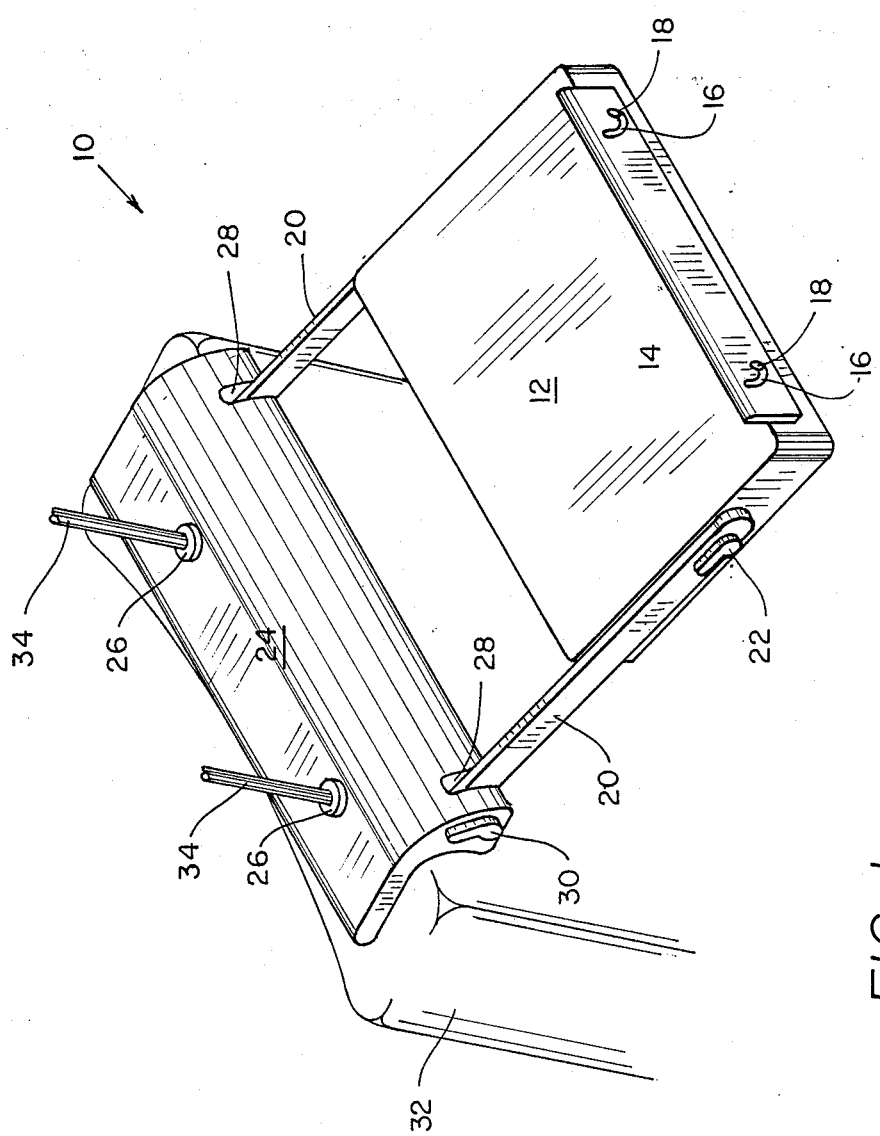
FIG. 1 is a perspective view of the desk for use in automobiles of the present invention pivoted to an operative position.

With reference now to the drawings, and in particular to FIG. 1 thereof, a new and improved desk for use in automobiles embodying the principles and concepts of the present invention and generally designated by the reference numeral 10 will be described.

More specifically, it will be noted that the first embodiment 10 of the invention includes a planar desk surface 12 pivotally mounted between a pair of support arms 20. An elongated edge strip 14 has a pair of curved slots 16 through which extend a pair of screws 18. Screws 18 are threaded into the leading edge of the planar desk surface 12, but are not tightened all the way. This allows the elongated edge strip 14 to be moved between raised and lowered positions. In the illustrated raised position, the elongated edge strip 14 prevents materials from sliding off the planar desk surface 12. A pair of cam locks 22 secure the planar desk surface 12 in a selected angularly adjusted position between the support arms 20. Another pair of similar cam lock mechanisms 30 secure opposite ends of the support arms 20 within a pair of slots 28 formed in an elongated base 24. A pair of spaced compression fittings 26 are received within circular apertures formed through the base 24 for the reception of head rest support rods 34 attached to the top back portion of a front automobile seat 32.

Figure 2:
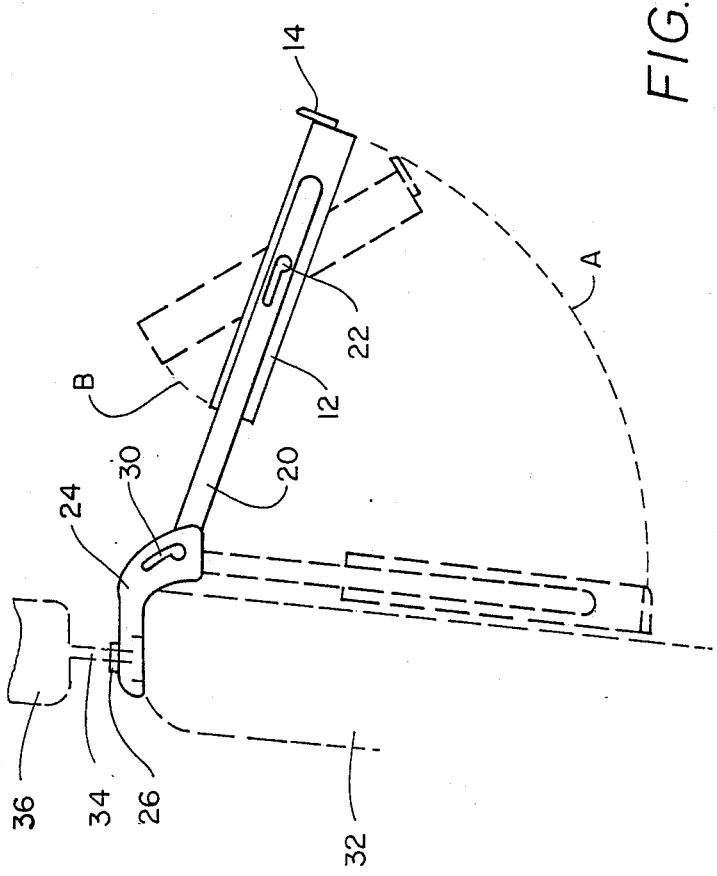
FIG. 2 is a side view illustrating the range of pivotal movement of the desk of the present invention.

With reference now to FIG. 2, it may be seen that by releasing the first pair of cam locks 30, the support arms 20 may be pivoted along an arc A, between an operative position and an unobtrusive storage position illustrated in dotted lines. In the storage position, the planar desk surface 12 extends parallel to the back of the front automobile seat 32. Cam locks 22 allow selective angular positioning of the planar desk surface 12 along an arc B. Thus, it may be seen that the planar desk surface 12 is provided with a compound pivotal adjustment along arcs A and B. It may also be seen that friction compression fittings 26 receive head rest support rods 34 which mount a conventional automobile head rest 36. Other forms of head rest mounting devices may be employed, such as hooks or straps which secure around the head rest 36. In the illustrated embodiment, however, it should be noted that due to the arcuate configuration of the elongated base 24, interference with the comfort of the occupants of the front seat is avoided, while providing a secure and stable mounting for the desk 12.

Figure 3:
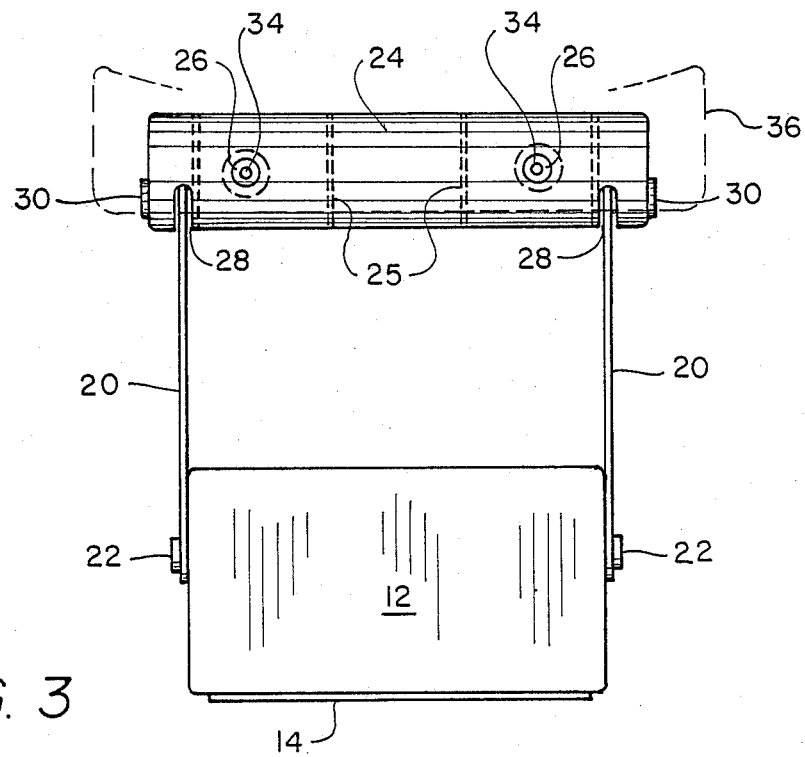
FIG. 3 is a top view of the desk of the present invention in an operative position.

As shown in FIG. 3, the planar desk surface 12 is supported between the pair of spaced support arms 20. A first pair of cam locks 22 allow selective angular adjustment of the desk surface 12 between the support arms 20. A second pair of cam locks 30 allow selective pivotal adjustment of the support arms 20 with respect to the elongated base 24. A plurality of spaced transverse supporting ribs 25 are formed within the interior of the elongated base 24. These reinforcing ribs 25 provide strength and rigidity to the structure. The elongated base 24 is preferably provided with a padded outer covering for the safety of the back seat occupants of the automobile.

Figure 4:
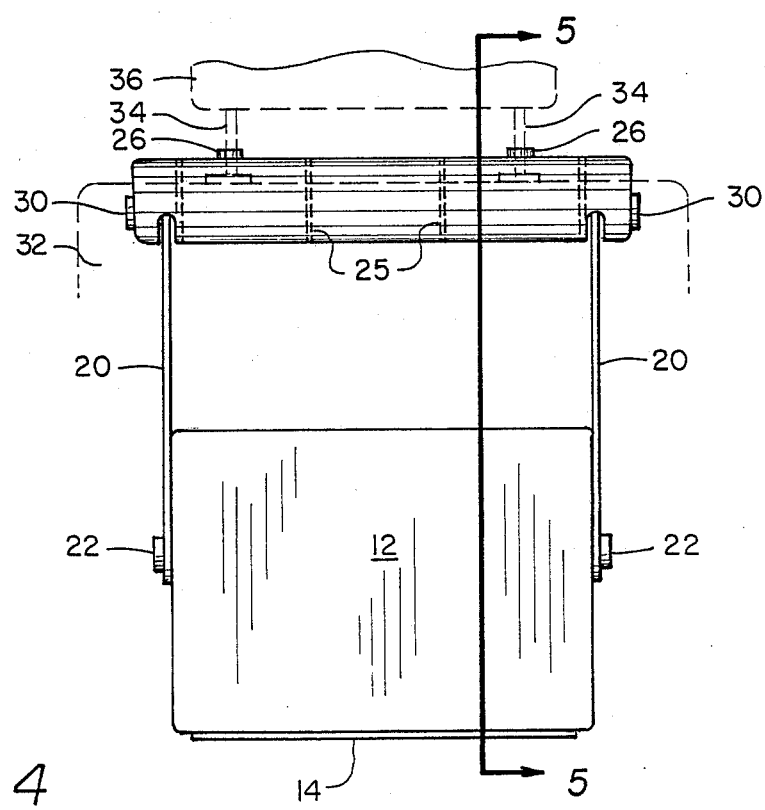
FIG. 4 is a view, looking forwardly from the back seat, of the desk of the present invention pivoted to a storage position.

With reference now FIG. 4, it should be understood that by releasing cam locks 30, the support arms 20 may be pivoted into a position in which they extedn parallel with the seat back 32. This allows the desk surface 12 to be stored in a position parallel to the seat back 32, in order not to interfere with the legs of the back seat occupant.

The details of construction of the compression fitting 26 may be understood with reference to the cross section view of FIG. 5. The fitting 26 is formed from a resilient material which frictionally engages the head rest support rod 34.

The details of the cam lock mechanisms 22 and 30 will now be described with reference to FIG. 6. The cam lock 22 has a handle portion and a transversely extending cylindrical shaft portion 23. The cam lock shaft 23 extends through aligned circular holes formed through the support arm 20 and the side wall of the planar desk 12. A soft plastic or rubber block 27 is attached to the underside of the planar desk surface 12. An eccentric cam lobe 25 is formed on the end of the shaft 23. When the cam lock mechanism 22 is in the illustrated position, the cam lobe 25 engages the resilient rubber block 27, thus wedging the desk 12 against any pivotal movement. When the cam lock mechanism 22 is rotated in the direction of the arrow, the cam lobe 25 is moved out of engagement with the rubber block 27, thus freeing the desk 12 for pivotal adjustment.

With reference now to FIG. 7, it may be seen that shaft 23 is formed with splines for press-fit engagement with cooperating splines on the handle portion 22. This two piece construction facilitates assembly.

As shown in FIG. 8, the cam lobe 25 deforms the rubber block 27. However, the resiliency of the rubber block 27 causes it to spring back to its original shape when the handle 22 is moved in the direction of the arrow to a release position. This allows the cam lock mechanism 22 to function repeatedly with a long service life.

As shown in FIG. 9, the lobe 25 is disposed upwardly, away from the rubber block 27, when in a release position. The circular shaft 23 is received through circular holes in the support arm 20 and the side wall of the desk 12. The construction of the cam locks 30 on the elongated base 24 is precisely analogous with the construction described above in reference to the cam lock 22. In the cam locks 30, it should be pointed out that the rubber blocks 27 will be disposed within the elongated base 24, one adjacent each slot 28.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A desk for use in automobiles having seats provided with head rests secured by support rods, comprising:

an elongated base having an arcuate upper surface;

a pair of spaced circular apertures formed through said elongated base;

a compression fitting in each of said circular apertures for securing said elongated base to the head rest support rods on an automobile seat;

a pair of arms adjustably pivotally mounted at opposite ends of said elongated base;

a first pair of cam locks at each end of said base for securing said arms in adjusted position;

a planar desk surface pivotally mounted between said pair of arms;

a second pair of cam locks on an end of each of said arms pivotally mounting and securing said planar desk surface for selective angular adjustment;

each of said first and second pair of cam locks having a transversely extending circular shaft mounted for manual rotation between locked and unlocked positions, a handle secured to one end of said circular shaft, a cam lobe on an opposite end of said shaft, and a resilient block mounted for abutment with said cam lobe in said locked position;

an edge strip secured to a leading edge of said planar desk surface;

a pair of spaced curved slots formed through said edge strip;

and a screw extending through each of said curved slots securing said edge strip to said leading edge of said planar desk surface for selective extension and retraction.

* * * * *